(No Model.)
J. B. SUTCH.
NUT LOCK.
No. 257,782.   Patented May 9, 1882.
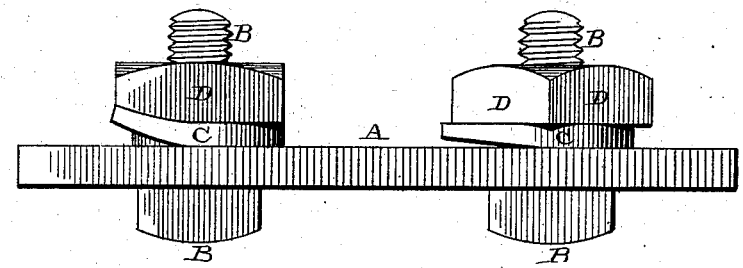
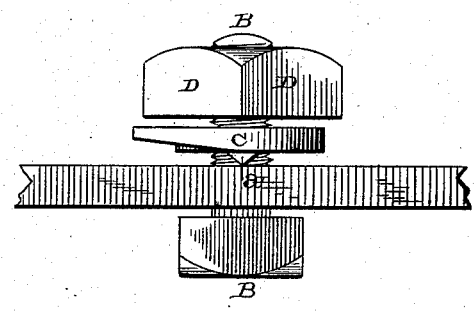
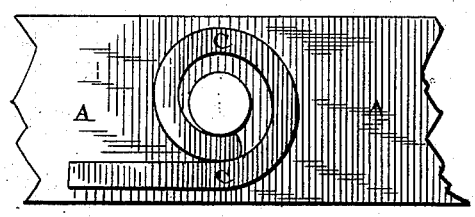

UNITED STATES PATENT OFFICE.

JOHN B. SUTCH, OF PITTSBURG, PENNSYLVANIA.

NUT-LOCK.

SPECIFICATION forming part of Letters Patent No. 257,782, dated May 9, 1882.

Application filed February 23, 1882. (No model.)

*To all whom it may concern:*

Be it known that I, JOHN B. SUTCH, a citizen of the United States, residing at Pittsburg, in the county of Allegheny and State of Pennsylvania, have invented certain new and useful Improvements in Devices for Locking Nuts, of which the following is a specification, reference being had therein to the accompanying drawings.

My invention relates to an improvement in devices for locking nuts; and it consists of a small steel rod bent into a circle or ring of a somewhat larger diameter than the bolt on which it is to be placed as a washer, one end of the rod overlapping the other on a tangent. On the under side of the inner end of the bar is a pointed projection or heel that, when the nut is screwed down on the bolt, is pressed into the underlying surface and keeps the washer from turning. The overlapping end of the bar is turned up and locks the nut.

The accompanying drawings represent my invention.

Figure 1 is a side elevation of my invention, showing the nuts screwed up into place. Fig. 2 is a side elevation of the parts not screwed into place. Fig. 3 is a plan view of the spring and plate.

A represents a fish-bar, B a bolt, C the washer, and D a nut. The washer C is made of a small steel bar bent into an open ring of a somewhat larger diameter than the bolt on which it is to be placed. One end of the ring or washer overlaps the other, and the under side of this overlapping end is cut away, leaving a space for the point of a lever to be introduced between it and the fish-bar or other surface, for the purpose of turning up that end to lock the nut. Under the inner end of the ring or washer is a pointed projection or heel, $a$, that during the process of screwing down the nut is gradually embedded in the fish-bar or other underlying surface, preventing the washer from turning as long as the nut remains in place. After the nut has been firmly screwed down the overlapping end of the washer is to be turned up against the side of the nut in order to lock it. To remove the nut from the bolt after having been locked, it is necessary first to bend down again the upturned end of the washer, for nothing short of overpowering force can break the lock.

Having thus described my invention, I claim—

A device for locking nuts on bolts, consisting of a small steel bar bent to form an open ring to be placed on a bolt under a nut as a washer, of which one end overlaps the other, the inner end having a pointed projection at its under surface, the other end, when bent upward, locking the nut, substantially as described.

In testimony whereof I affix my signature in presence of two witnesses.

JOHN B. SUTCH.

Witnesses:
 LOUIS MOESER,
 F. A. LEHMANN.